Aug. 10, 1937.  W. E. HALBERT  2,089,477
WELL FLOWING DEVICE
Filed March 19, 1934
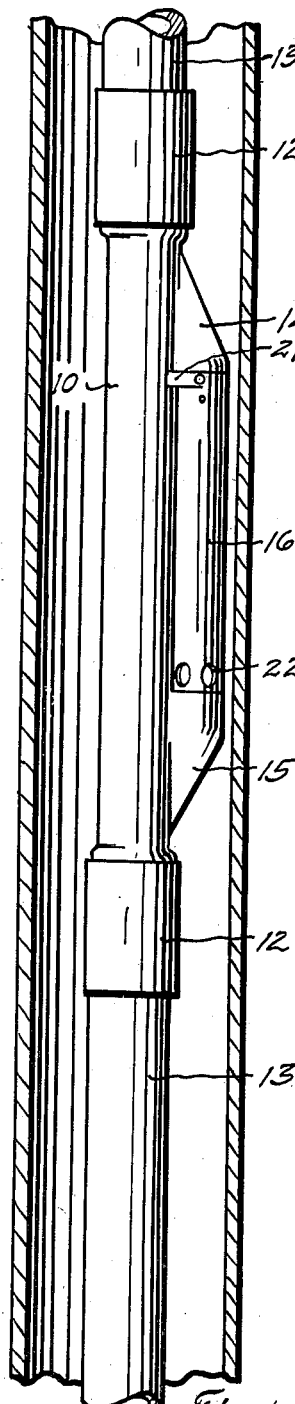
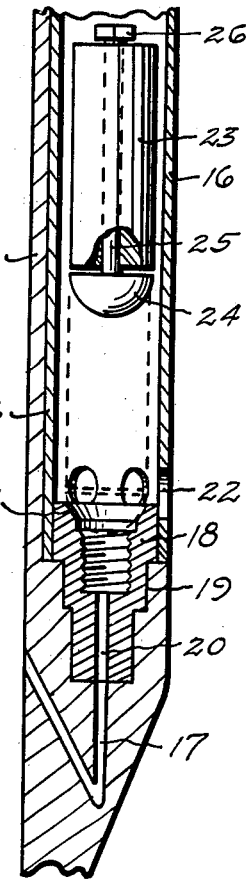
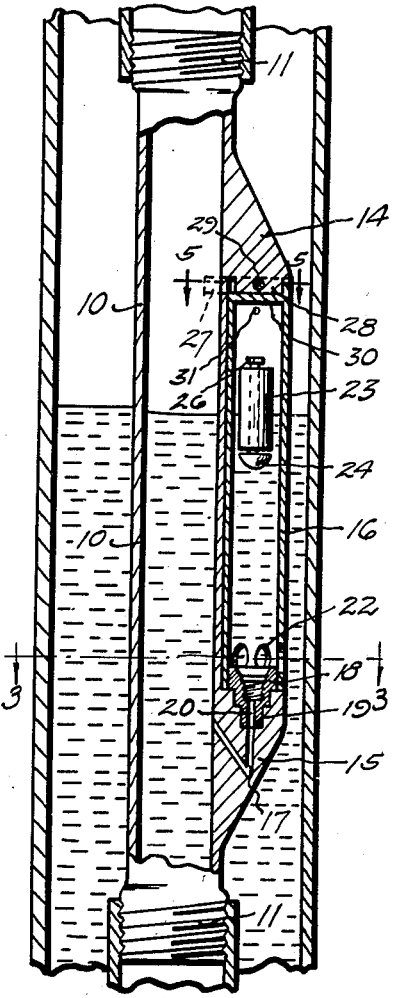
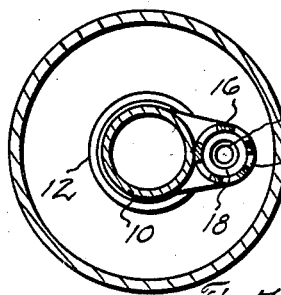
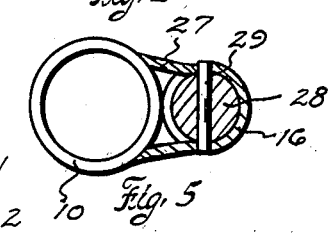
Inventor
William E. Halbert
By Jack Ashley
Attorney Patented Aug. 10, 1937

2,089,477

UNITED STATES PATENT OFFICE 2,089,477

WELL FLOWING DEVICE

William E. Halbert, Fort Worth, Tex., assignor, by mesne assignments, to Southwestern Flow-Valve Corporation, Tarrant County, Tex.

Application March 19, 1934, Serial No. 716,256

2 Claims. (Cl. 166—2)

This invention relates to new and useful improvements in well flowing devices.

One object of the invention is to provide an improved device for flowing wells by a pressure fluid exerted on the well fluid in the casing, whereby the well fluid is admitted to the tubing at one or more elevated points below the liquid level and above the tubing inlet.

A particular object of the invention is to provide a flow device adapted to be mounted on a tubing and provided with a float actuated valve for controlling the admission of fluids to the tubing, a particular feature residing in the float which is made solid so as not to collapse under pressure and which carries a valve at its lower end to engage a seat and positively prevent the admission of the pressure fluid to the tubing when the liquid level lowers to a predetermined point, which is always above the valve seat.

Another object of the invention is to provide a flowing device having a float made of solid buoyant material which will not collapse under pressure and a valve carried by the float and made of fiber or other non-metallic material which will be light in weight and yet tough enough to resist wear and distortion. The advantage of such a valve is that it will not load the float and may be used with a metal seat without danger of locking when subjected to magnetic influences.

A further object of the invention is to provide a flowing device which may be readily connected in the string of tubing and equipped with an easily removed float chamber placed exteriorly so as not to interfere with tools passing up and down the tubing.

A construction designed to carry out the invention will be hereinafter described, together with other features of the invention.

The invention will be more readily understood from a reading of the following specification and by reference to the accompanying drawing, in which an example of the invention is shown, and wherein:

Figure 1 is an elevation of a device constructed in accordance with the invention and connected in a string of tubing, Figure 2 is an enlarged vertical sectional view of the same, Figure 3 is a horizontal cross-sectional view, taken on the line 3—3 of Figure 2, Figure 4 is an enlarged vertical sectional view of the float mechanism, and Figure 5 is an enlarged horizontal cross-sectional view taken on the line 5—5 of Figure 2.

In the drawing the numeral 10 designates a tubing section or tubular conductor having screw-threaded ends 11, whereby it may be screwed into the connection collars 12 of a string of tubing 13. The tubing section or conductor has an upper boss 14 and a lower boss 15 which are reduced toward the ends of the section and merged thereinto. The bosses are preferably made integral with the section, but could be welded thereto. A tubular float chamber or casing 16 is mounted longitudinally of the section against the outer side thereof between the bosses and supported thereby.

The lower boss 15 is formed with a V-shaped duct 17, but any suitable duct may be used. A shouldered valve-seat bushing 18 is pressed into a socket 19 at the upper end of the boss and has a central port 20 registering with the duct. The bushing is internally screw-threaded so that a tool may be inserted therein when it is desired to pull the bushing. The bushing extends above the boss and is of such diameter as to fit in the lower end of the casing 16. The bushing has a valve seat 21 at its upper end. Opposite the seat the casing has ports 22 for admitting a liquid or fluid.

Within the casing 16 is a cylindrical float 23 which is one of the important features of the invention. This float is given sufficient length to cause it to remain upright in the casing and it has sufficient clearance therein to assure free up and down movement. The float is solid, because hollow floats are likely to collapse, and it is made of cork or some other buoyant material. The float carries a semi-spherical or rounded valve 24 which I prefer to form of fibrous material or some other non-metallic substance suitable for the purpose. It should be tough and capable of use in oil. It may be made of metal, particularly if the bushing 18 is made of fibrous material.

I prefer to connect the float and the valve by a rod 25 extending axially through the float and free to slide therethrough. The lower end of the rod is secured in the valve so that the same cannot become detached therefrom. By making the rod longer than the float and providing a cap 26 on the upper end of the rod, provision is made for the expansion or elongation of the float when submerged in liquids. Where cork is used, it may be shellacked or otherwise coated to protect it against deterioration. When the float is not supported by liquid in the chamber 16, the valve 24 will engage in the seat 21 and close the passage to the interior of the section 10.

As a convenient fastening method, I have provided a yoke 27 at the upper end of the casing 16 for engaging around a lug 28 on the bottom of the boss 14 and bearing against the section 10. A pin or key 29 is passed through the casing and the lug so as to hold the casing in place. Just below the yoke the casing has a transverse partition 30, which closes its upper end and below the partition a vent hole 31 is provided. The lower end of the casing is held in place by the bushing 18. When it is desired to remove the casing, it is merely necessary to drive out the pin or key 29, swing the upper end of the casing outwardly to clear the lug 28 and then lift it off of the bushing.

In using the device one or more of the sections 10 are connected in the tubing 13 at spaced elevations, the uppermost device being below the liquid level in the well. The liquid in the well will enter the casing 16 through the ports 22 and elevate the float 23, whereby the valve 24 will be lifted from the valve seat 21. As the tubing 13 and the sections 10 will contain oil up to the liquid level in the well, no liquid will flow through the duct 17. However, when a pressure is built up on top of the liquid it will be forced through the bushings 18 and ducts 17 into the string of tubing, whereby liquid will be elevated in said tubing. When the liquid level recedes below the top of the casing 16 of the uppermost device, the float 23 thereof will likewise recede. The length of the float is such that the valve 24 will seat before the liquid level reaches the ports 22. This will assure a positive closing of the duct 17 and prevent the pressure fluid from entering the tubing.

Actual use and tests of the device have shown that it possesses many advantages. The float chamber or casing 16 may be readily removed to gain access to the float or the valve seat without disconnecting the section 10 from the string of tubing. The section 10 having the same bore as the tubing 13 will not interfere with the running of tools up and down the tubing. It has been found that paraffin deposits are reduced to a minimum because the flow of the fluid is not interrupted, but flows out quickly and steadily, thus preventing chilling.

By using a fiber valve or a fiber bushing, magnetic influences due to lodestone and the like, are defeated, and locking of the valve is prevented. The use of springs and weights are eliminated and the valve is entirely controlled by buoyancy. The valve being solid cannot collapse. It has been found that the device more effectually flows the water out of oil wells and it operates equally as well under high or low pressures.

What I claim and desire to secure by Letters Patent, is:

1. A well flowing device comprising, a tubular member adapted to be connected in a tubing string, a valve seat member mounted exteriorly of said tubular member, there being a V-shaped passage leading from said valve seat to the interior of said member to direct the flow from the valve seat upwardly in the tubular member, a float casing located above the valve seat and having an inlet adjacent the valve seat, whereby fluid from the well casing may pass through the float casing to the well tubing, and a float mounted in the float casing and carrying a valve for engaging the valve seat to control the flow through the passage.

2. A well flowing device comprising, a tubular member adapted to be connected in a tubing string, a valve seat member mounted exteriorly of said tubular member, there being a V-shaped passage leading from said valve seat to the interior of said member to direct the flow from the valve seat upwardly in the tubular member, a float casing located above the valve seat and having an inlet adjacent the valve seat, whereby fluid from the well casing may pass through the float casing to the well tubing, and an elongated solid float mounted in the float casing and having a non-magnetic valve at its lower end for engaging the valve seat to control the flow through the passage.

WILLIAM E. HALBERT.